United States Patent [19]
Woo

[11] Patent Number: 5,134,594
[45] Date of Patent: Jul. 28, 1992

[54] GEOPHONE SPRING

[75] Inventor: Daniel M. Woo, Missouri City, Tex.

[73] Assignee: Shaw Industries, Ltd., Rexdale, Canada

[21] Appl. No.: 725,198

[22] Filed: Jul. 3, 1991

[51] Int. Cl.⁵ .............................................. H04R 11/00
[52] U.S. Cl. .................................... 367/187; 267/161
[58] Field of Search ............... 367/187, 182, 183, 185; 267/161, 163

[56] References Cited

U.S. PATENT DOCUMENTS

| | | | |
|---|---|---|---|
| 4,623,991 | 11/1986 | Vitringa | 367/187 |
| 4,685,094 | 8/1987 | Vitringa et al. | 367/187 |

Primary Examiner—J. Woodrow Eldred
Attorney, Agent, or Firm—Vaden, Eickenroht, Thompson & Boulware

[57] ABSTRACT

An improved spring spider for geophones is disclosed that has the desired ratio of spurious resonant frequency to the natural frequency of the geophone and can absorb the sharp lateral forces imposed on the geophone during destructive testing and hand usage.

12 Claims, 2 Drawing Sheets

GEOPHONE SPRING

This invention relates generally to geophones and, more particularly, to suspension springs for geophones or seismometers.

Geophones are devices that sense motion by suspending an inertial reference mass structure from a rigid, fixed, supporting structure. Typically, the mass is an annular coil form suspended by springs in the annulus between a magnet assembly and the housing of the geophone. Usually, one spring is attached at each end of the coil form. The springs position the coil form within the magnetic field of the magnet assembly so that the coil form is centered laterally and along the axis of the magnetic field. The springs also form a suspension system having a predetermined resonant frequency.

In seismic operations, seismic waves are imparted into the earth's crust at or near the earth's surface and portions of those seismic waves are reflected or refracted from the boundaries of subsurface layers. Geophones are arranged in arrays or groups on the earth's surface. When reflected or refracted waves encounter a geophone, the coil form, which is suspended between the two springs, tends to stand still while the geophone housing and its connected magnet assembly moves with the earth's surface. The movement of the coil form through the magnetic field of the magnet assembly causes a voltage to be generated at the output of the geophone. The outputs of the arrays of geophones are recorded in a form that permits analysis. Skilled interpreters can discern from the analysis the shape of subsurface formations and the likelihood of finding an accumulation of minerals, such as oil and gas.

In present day geophones, spider springs are used extensively. Such springs are usually made from discs of spring material and have an inner ring and an outer ring that are connected by a plurality of legs. The legs are formed by etching or stamping the spring material in accordance with a predetermined pattern. Generally, three such legs are used, and the three-legged arrangement is generally considered the most advantageous.

The legs of geophone spider springs usually have a rectangular cross-section and are curved along their lengths between the junctures with the inner and outer rings of the spring. After etching, the spring is "preformed" according to known techniques. When preforming is complete, the inner ring is offset or displaced relative to the outer ring, such that when the coil mass is suspended between two such springs, the inner ring, legs, and outer ring of each spring lie in the same plane.

A geophone is intended to sense motion from a direction that is roughly parallel to the axis of movement of the coil form with respect to the geophone housing. Therefore, it is desirable to eliminate or minimize the effects of any lateral motion of the coil form in response to forces that are not parallel to the axis of movement of the suspended coil form within the geophone.

In seismic operations, an impulse that is not truly parallel with the geophone axis and that contains a frequency component at or very near to that of the spurious frequency causes the geophone to produce an undesired or false EMF in the coils. Because of its high Q, the movement will continue for some time after the force that caused it has subsided. This resonance is considered to be the main spurious frequency in a geophone and it is highly undesirable as it limits the geophone's upper clean bandwidth.

Inasmuch as the geometry and the mass of the coil form for a given model of geophone are constant within manufacturing limits, the spurious resonance is also constant. The frequency of the spurious, resonance can therefore be raised or lowered by changing the geometry of the suspension springs. This characteristic has been used to raise the frequency of these false signals until they are beyond the desirable frequency spectrum of the geophone by increasing the lateral stiffness of the spring. With this approach, these false signals do not interfere with or corrupt signals of interest. A common method of increasing the lateral stiffness of the spring is to shorten the spring legs. Unfortunately, the signal distortion caused by spring nonlinearity is increased when the legs are relatively short and spring life is reduced.

In U.S. Pat. No. 4,323,994, there is disclosed a geophone spring whose legs have a straight segment. In U.S. Pat. No. 4,458,344 there is disclosed a geophone spring in which the flexural stress is equalized throughout the length of each leg by increasing the width of the leg at the portions of the leg experiencing the greatest moment.

These structural features were made in the springs in an effort to achieve much higher spurious resonant frequencies while still maintaining the linear response of the spring.

The effort to achieve much higher resonant frequencies continued with the development of the spring described in Vitringa U.S. Pat. No. 4,623,991. Vitringa designed his spring to have arms as straight as possible by requiring the inner edge of each leg to lie substantially on an arc having a radius of at least 1.25 times greater than the distance from the center of the spring to the inner edge of the leg at the junction point where the leg joins the inner ring. Giving each leg as little curvature as possible, the lateral stiffness of the spring was improved. Subsequently Vitringa, along with Hagedoorn, added a lateral compliance device to the spring of the '991 patent. This spring is described in U.S. Pat. No. 4,685,094. The lateral compliance device was formed by overlapping arcuate slots adjacent to the edge of the central opening through the spring.

In summary, it has been the goal of the art to provide a spider spring for geophones that has a high ratio of the spurious resonance of the spring to the natural frequency without deleterious effect to the linearity of the spring's response and that can withstand sharp lateral forces without damage and it is an object of this invention to provide such a spider spring.

It is a further object of this invention to provide a geophone spring having an inner and outer annular ring connected by spring arms of increased stiffness and a ratio of spurious resonant frequency to the natural frequency of the geophone between 20 and 30 to 1.

It is a further object of this invention to provide such a geophone spring having improved lateral elasticity to allow the springs to withstand rapid acceleration or deceleration as encountered in hard usage or destruction tests of a geophone.

It is a further object of this invention to provide such a geophone spring in which the spring arms are generally L-shaped having one long arcuate section and one relatively short straight section that is connected to the long section at an angle to position the short leg to better resist lateral forces.

It is a further object of this invention to provide such a spring having grooves between the spring arms and the outer ring for absorbing lateral forces imposed on the spring and in one embodiment having arcuate grooves located in the outer ring to further provide for the absorption of sharp lateral forces imposed on the spring.

These and other objects, advantages, and features of this invention will be apparent to those skilled in the art from a consideration of this specification including the attached drawings and appended claims.

IN THE DRAWINGS

Figure 1:
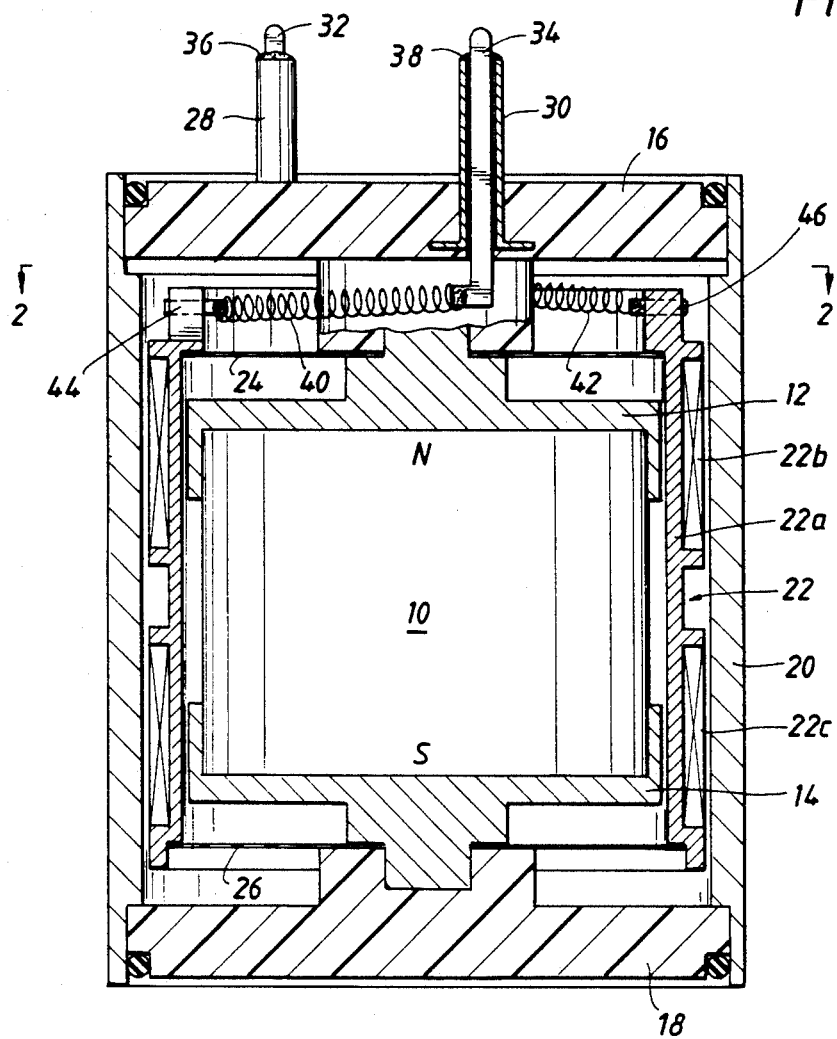
FIG. 1 is a vertical sectional view through a typical pigtail type geophone showing the structure with which the springs of this invention are associated.
Figure 2:
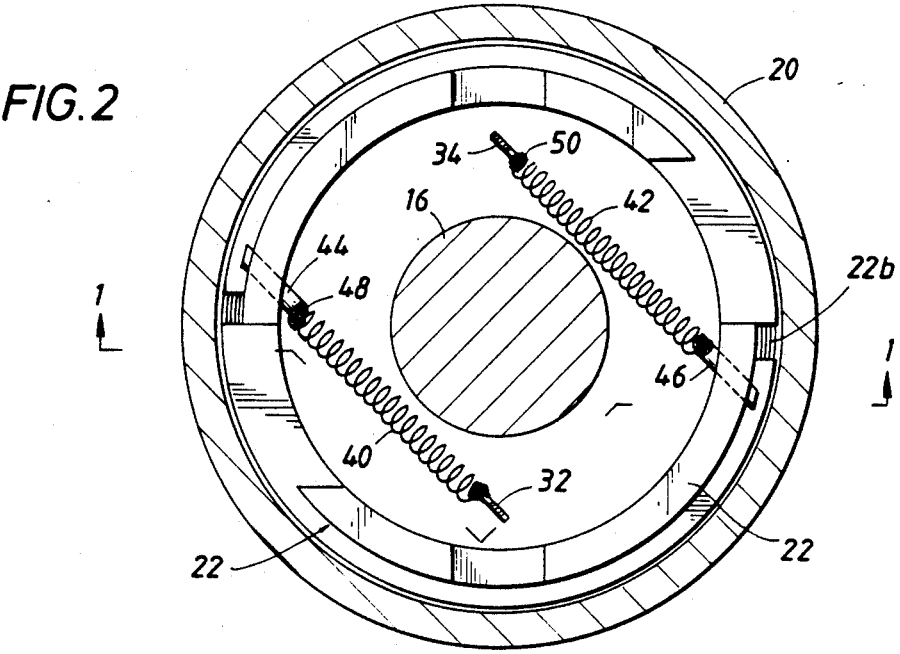
FIG. 2 is a sectional view taken along line 2—2 of FIG. 1.

The geophone, shown in FIGS. 1 and 2, includes magnet 10 with pole pieces 12 and 14 positioned at each end. The magnet and its pole pieces are clamped between top 16 and bottom 18 of case 20. Coil mass 22 includes coil form 22a upon which wire coils 22b and 22c are wrapped. The coil mass is supported for movement relative to the longitudinal axis of the case by diaphragm springs 24 and 26.

Case top 16 is of molded plastic material to reduce the weight of the geophone and to reduce the cost of manufacturing the case top, as compared to the metal case top used in prior art geophones.

When top 16 is molded, eyelets 28 and 30 are embedded in the case top so that they extend outwardly from the case top as shown in FIG. 1. The eyelets are made of electrically conductive material, such as copper. Outside terminals 32 and 34, also of electrically conductive material, extend through the eyelets and are soldered to the eyelets to seal the annulus between the inside of the eyelets and the outside of the terminals and to electrically connect the terminals to the eyelets. These soldered joints are indicated by the numbers 36 and 38.

Figure 3:
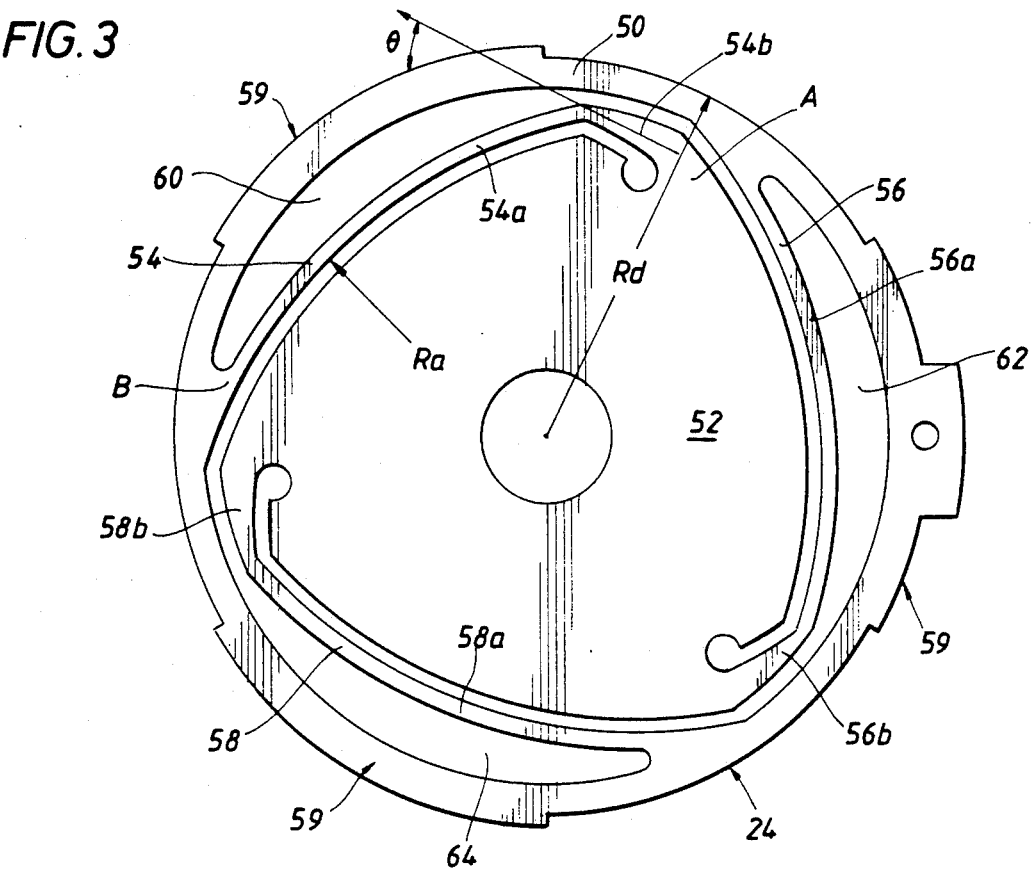
FIG. 3 is a plan view of the geophone spring of this invention.

As shown in FIG. 2, pigtails 40 and 42 have one end connected to coil terminals 44 and 46 by solder, which is indicated by the members 48 and 50. The other ends of the pigtails are connected to terminals 32 and 34 also by soldered connections indicated by the numbers 52 and 54. The two ends of the wire forming coils 22b and 22c are indicated by the numbers 43 and 45 (FIG. 3). They are also connected to terminals 44 and 46 by soldered connections 48 and 50.

Figure 4:
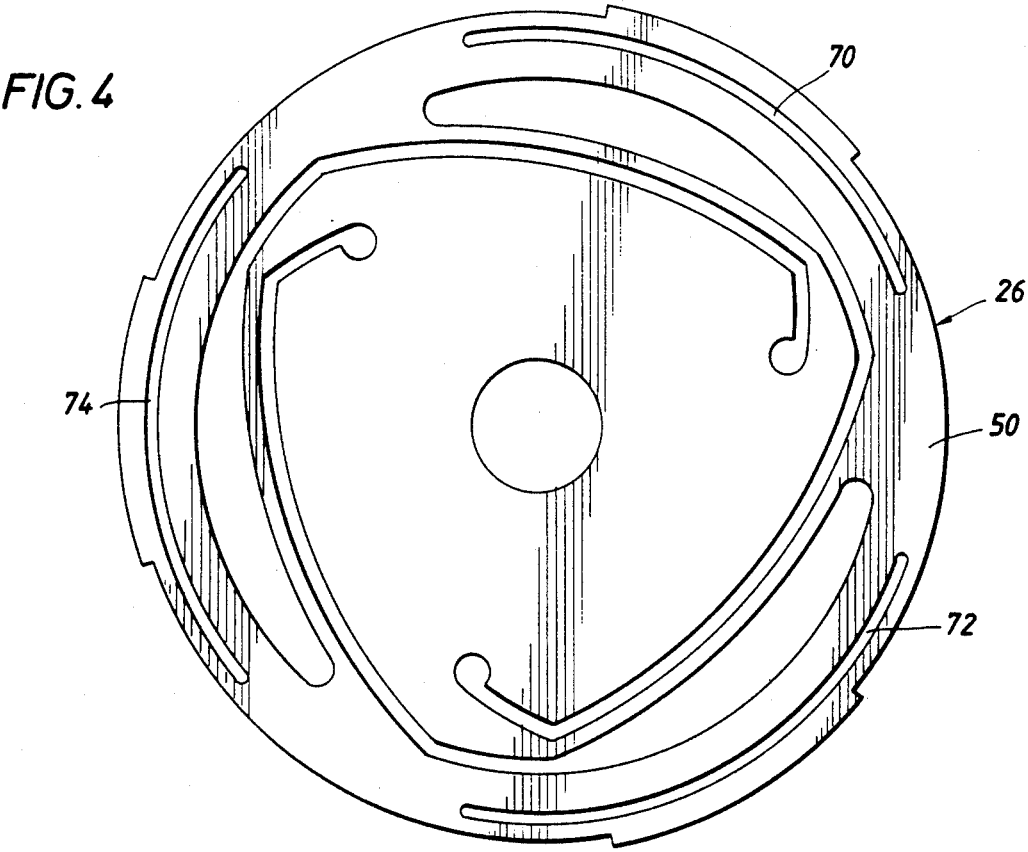
FIG. 4 is a plan view of an alternate embodiment of the geophone spring of this invention.

The structures of spring spiders 24 and 26 are shown in FIGS. 3 and 4. Spring 24 will be described first. It includes outer ring 50, inner ring 52 that are connected by three spring arms 54, 56, and 58. The spring arms are formed by etching or stamping the spring material in accordance with a predetermined pattern. In this case, the arms are formed by three grooves 60, 62, and 64. Each groove extends along the outside edge of one of the legs and along the inside edge of the next adjacent leg. For example, groove 60 extends along the outer edge of arm 54 and along the inner edge of arm 56. In the same manner, groove 62 extends along the outer edge of arm 56 and the inner edge of arm 58 and groove 64 extends along the outer edge of spring arm 58 and the inner edge of arm 54.

Each spring arm includes two sections. Spring arm 54 for example, includes elongated gently curved section 54a and relatively short substantially straight section 54b that increases in width from its juncture with section 54a to its juncture with the inner ring at point A. Section 54a of the arm is connected to the outer ring at juncture point B. The combination of the two sections 54a and 54b to form a generally L-shaped arm provides the desired resistance to lateral forces imposed on the spring and the desired ratio of 20 to 25 to 1 between the spurious resonance of the spring and its natural frequency. Spring arms 56 and 58 are similarly shaped having elongated gently curved sections 56a and 58a and short straight sections 56b and 58b that increase in width toward their juncture with the inner ring. Outer ring 50 has sections 59 of increased width opposite each elongated section of the arms to provide more stiffness to the spring at this point to further resist lateral forces.

One of the important features of the shape of the spring arms are the short substantially straight sections 54b, 56b, and 58b that are positioned so as to better resist bending under the influence of sharp lateral forces that are imposed on the spring because a substantial component of these forces will act to place these sections in longitudinal compression rather than bending.

The grooves that form the arms also form relatively wide spaces between the outer ring and the spring arms. These spaces are designed to allow the outer ring to conform as required for the spring mass to engage either the magnet assembly or the housing of the geophone to stop its lateral movement when the geophone is struck a sharp blow from the side. In other words, nothing is going to move but the spring mass and the spring mass can move only a limited distance until it strikes either the magnet assembly or the housing. Therefore, spring spiders that support the coil mass need only allow sufficient lateral movement for the coil mass to strike one of these stops to serve its purpose, which is to absorb this lateral movement without suffering permanent damage. The design of the spring as shown in FIGS. 3 and 4 accomplishes this result.

FIG. 4 is identical to FIG. 3 except outer ring 50' is much wider, which allows grooves 70, 72, and 74 to be etched in the outer ring between the edge of the outer ring and the portion of the grooves along the outside edge of the arms. This increases the ability of the bottom spring to yield to lateral forces without damage.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a geophone having a cylindrical housing having a longitudinal axis, a cylindrical magnet assembly in the housing having its longitudinal axis along the longitudinal axis of the housing, said magnet assembly forming an annulus between the magnet assembly and the housing, and fixed against lateral and axial movement relative to the housing, said magnet assembly forming an annulus between the magnet assembly and the housing, a cylindrical coil-mass located in the annulus between the magnet assembly and the housing and surrounding the magnet assembly, and disc-shaped spider springs mounted on the magnet assembly for supporting the coil-mass for longitudinal and lateral movement of the coil-mass relative to the magnet assembly, each of said spider springs comprising an outer ring, an inner ring, and three arms connecting the outer and inner rings, said arms extending from a juncture point on the outer ring to a juncture point on the inner ring, said arm being formed by three slots, each of which extends along the outside surface of one leg and the inside surface of an adjacent leg, said portions of the slots that extend along the outside surface of each leg being substantially wider for most of their length than the rest of the slot so the outer ring can move laterally toward the center of the springs with the coil-mass until the coil-mass engages either the housing or the magnet assembly when the geophone is subjected to sharp lateral forces without stressing the arms beyond their elastic limits.

2. The geophone of claim 1 in which one of the springs has arcuate grooves in the outer ring between the portions of the slots along the outside surface of the arms and the outer edge of the spring to increase the ability of the spring to accommodate lateral movement of the coil-mass without the stress in the arms exceeding the elastic limit.

3. The geophone of claim 1 or 2 in which each spring is further provided with a plurality of tabs extending laterally from the portions of the edge of the outer ring located radially of the arms to stiffen the outer ring of the spring.

4. The geophone of claim 1 in which the width of each portion of the slot along the outer edge of each arm decreases in width from the middle toward each end.

5. The geophone of claim 1 in which each arm includes a curved section extending from one juncture and a substantially straight section extending from the other juncture.

6. In a geophone having a cylindrical housing having a longitudinal axis, a cylindrical magnet assembly in the housing having its longitudinal axis along the longitudinal axis of the housing, said magnet assembly forming an annulus between the magnet assembly and the housing, and fixed against lateral and axial movement relative to the housing, said magnet assembly forming an annulus between the magnet assembly and the housing, a cylindrical coil-mass located in the annulus between the magnet assembly and the housing and surrounding the magnet assembly, and disc-shaped spider springs mounted on the magnet assembly for supporting the coil-mass for longitudinal and lateral movement of the coil-mass relative to the magnet assembly, said lateral movement being limited by the engagement of the coil-mass with either the housing or the magnet assembly, each of said spider springs comprising an outer ring, an inner ring, and three arms connecting the outer and inner rings, said arms extending from a juncture point on the outer ring to a juncture point on the inner ring, each arm including a curved section extending from the outer ring juncture and a substantially straight section extending from the other juncture, said straight section extending from the juncture in a direction to resist lateral movement of the arm, said arms being formed by three slots, each of which extends along the outside surface of one leg and the inside surface of an adjacent leg, said portions of the slots that extend along the outside surface of each leg being substantially wider for most of their length than the rest of the slot so the outer ring can move laterally with the coil-mass sufficiently for the coil-mass to engage either the housing or the magnet assembly when the geophone is subjected to sharp lateral forces without stressing the arms beyond their elastic limits.

7. The geophone of claim 6 in which one of the springs has arcuate grooves in the outer ring between the portions of the slots along the outside surface of the arms and the outer edge of the spring to increase the ability of the spring to accommodate lateral movement of the coil-mass without the stress in the arms exceeding the elastic limit.

8. The geophone of claim 6 or 7 in which each spring is further provided with three tabs extending laterally from the portions of the edge of the outer ring located radially of the arms to stiffen the outer ring of the spring.

9. The geophone of claim 6 or 7 in which the width of each portion of the slot along the outer edge of each arm decreases in width from the middle toward each end.

10. A geophone spider spring for suspending an inertial mass structure from a rigid support structure, said geophone spring comprising an outer ring, an inner ring, and a plurality of arms connecting the outer ring to the inner ring, each arm including a relatively long arcuate section having one end connected to the outer ring and a relatively short substantially straight section connected to the inner ring, said arcuate section having a radius of curvature greater than the radius of curvature of the outer edge of the spring and the short section is connected to the long section at an angle so the longitudinal axis of the short section is positioned to better resist bending when the geophone is subjected to lateral forces.

11. The geophone spider spring of claim 10 in which the short section increases in width in the direction of the inner ring.

12. The geophone spider spring of claim 10 or 11 in which the longitudinal axis of the short section makes an angle of about 90° with a radius of the spider spring.

* * * * *